Patented Oct. 19, 1926.

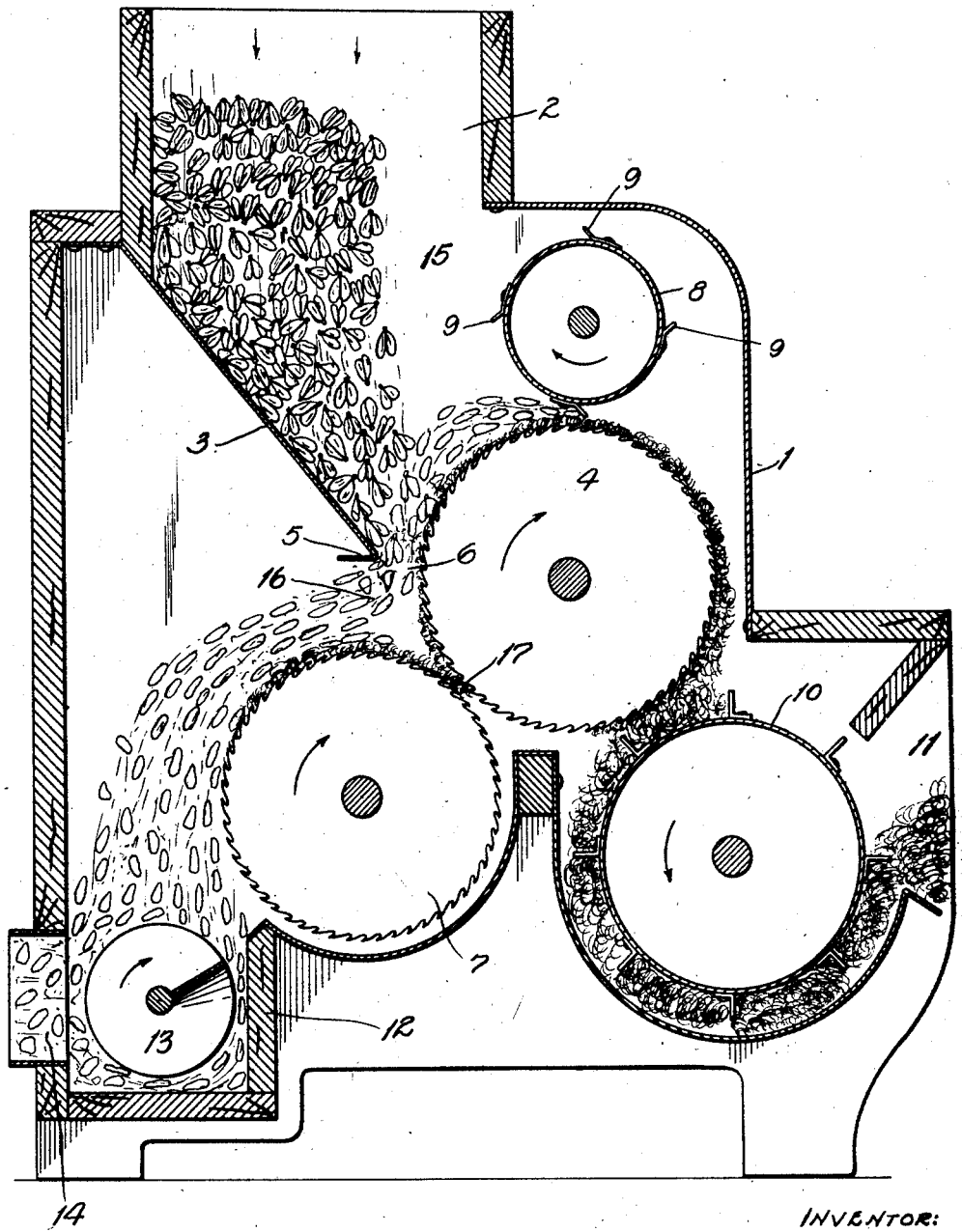

1,603,971

UNITED STATES PATENT OFFICE.

JOHN E. MITCHELL, OF ST. LOUIS, MISSOURI.

COTTON-CLEANING MACHINE.

Application filed February 27, 1926. Serial No. 91,063.

This invention relates to certain new and useful improvements in cotton cleaning machines of the general type illustrated in various prior patents granted to me, such as Patent No. 1,383,007, dated June 28th, 1921, and Patent No. 1,426,588, dated August 22nd, 1922.

The present invention has for its general object the provision of novel means for recovering the cotton from the mass of mixed cotton and hulls supplied to the cleaning mechanism, and is characterized, chiefly, by the provision of two saw cylinders, located one above the other, and rotating in the same direction and having teeth cut in the same direction, the surfaces of the saw cylinders being brought into sufficiently close proximity to permit the upper saw cylinder to remove the cotton from the teeth of the lower saw cylinder. Involved in this arrangement as a further characteristic feature of the invention, is the provision of a hull-board which, at its lower end, defines a space between it and the surface of the upper saw cylinder of sufficient width to permit the free passage of hulls through the same, and a second space between it and the upper surface of the lower saw cylinder of such extent as to permit hulls to be knocked through the same over and beyond the lower saw cylinder under impact of the saws of the upper cylinder, while permitting the lower saw cylinder to carry cotton falling on said saw cylinder through said space and deliver the same to the saws on the upper saw cylinder. In practice, some of the cotton will be actually thrown by centrifugal force from the lower saw cylinder onto the surface of the upper saw cylinder, and a certain amount of the cotton will be engaged by the teeth of the lower saw cylinder and be carried to the point of closest proximity to the teeth of the upper saw cylinder, which latter will act to engage and remove the cotton from the lower saw cylinder.

In the present commercial machine made under my various patents, I employ a hull roller in connection with the lower saw cylinder. The contsruction and use of these rollers is disclosed in the patents above referred to. While these hull rollers greatly reduce the loss of cotton, they do not altogether prevent such loss, especially under present operating conditions where, owing to the demand for increased capacity, a larger amount of cotton is permitted to fall through into contact with the rollers than obtains under normal operating conditions. As the hull rollers of my prior patented constructions are smooth, a great deal of this cotton is not carried back to the lower saw cylinder but slips past the hull roller and goes out into the discharge. In the present invention, I substitute for the rollers disclosed in the patents referred to, a saw cylinder having pointed teeth which will positively engage any cotton coming into contact with it and deliver the same back to the saw cylinder above it.

Other features and advantages of the invention will be better understood from the detailed description of the invention to follow, and will be distinctively pointed out in the claims.

The invention is illustrated in the accompanying drawing, in which—

The view is a cross-section of a cotton cleaning machine constructed according to my invention.

Referring to this drawing, the numeral 1 indicates, generally, a casing enclosing the operating parts and having in its top a feed opening 2 through which mixed cotton and hulls are received from a suitable boll-breaking device, which may be either a part of the machine, as shown in the patents above referred to, or be operated independently of the machine. Mounted beneath this opening is an inclined hull-board 3 which is directed toward the upper saw cylinder 4, and the lower edge 5 of which defines the size of a space 6 between it and the surface of said upper saw cylinder. Located below the lower end of the hull-board 3 and the saw cylinder 4 and to one side of the latter is a lower saw cylinder 7. The surfaces of these saw cylinders are arranged to rotate in such proximity to each other that the lower saw cylinder may deliver cotton to, or have cotton removed therefrom by, the teeth of the upper saw cylinder. The saw cylinders 4 and 7 are rotated in the same direction and their teeth are cut in the same direction, so that the teeth of the two saw cylinders will be pointed toward each other and move in opposite directions at their point of closest proximity.

Arranged above the upper saw cylinder 4 is a kicker roll 8 having longitudinal angle bars 9 mounted on its surface at equal distances apart and extending from end to end thereof. This kicker roll operates to knock back hulls from the cotton carried up by the saw cylinder 4. Below the saw cylinder 4, I arrange a suitable doffer 10 which operates to remove the cotton from the teeth of said saw cylinder and discharge it through an opening 11 in the casing, whence it passes into the gin. At the other side of the casing and below the saw cylinder 7, I provide a partition 12 which, with the bottom and side of the casing, forms a trough in which I mount a worm conveyor 13 which operates to discharge the hulls falling into the trough through an outlet 14.

In operation, the mixed cotton and hulls fall into a working chamber 15, which is defined by the hull-board 3, the saw cylinder 4 and the kicker roll 8. The operation and the results obtained in the use of this part of the machine are practically the same as in the machines disclosed in the patent referred to. The mixed cotton and hulls, on coming in contact with the saw cylinder 4, are carried up to the separating point between the saw cylinder and the kicker roll 8 which, rotating in the direction shown by the arrow, causes the hulls to be pulled loose from the cotton and kicked back through the working chamber onto the hull-board 3, where the loose hulls slide out through the opening or space 6 between the saw cylinder 4 and the bottom of said hull-board. When this space is made wide enough to permit the free discharge of the hulls, some cotton also passes through the space with the hulls, a portion of which has heretofore been reclaimed by catching it on the smooth rollers shown in the construction of machines of my patents above referred to. As stated, in the use of these smooth rollers, some of the cotton slides on over and is lost with the hulls. In the present invention, I provide, in place of the smooth rollers referred to, an extra saw cylinder 7, provided with teeth that will positively engage any cotton coming in contact with it. In the use of this saw cylinder, the only way any cotton of value could be lost is for the teeth of the saw cylinder 4 to throw or kick the cotton entirely over and free of the saw cylinder 7. I have found, from experience, that by constructing the cylinder 7 of proper diameter in relation to the speed at which the cylinder 4 rotates, that the teeth of the cylinder 4 can kick or throw the hard hulls entirely over and free of the cylinder 7 without throwing any cotton of value out that far, and even though some of the cotton is thrown nearly over the cylinder 7, or too far to be brought back by a smooth roller, so long as it falls in contact at any point with the cylinder 7, it is brought back and delivered to the teeth of the cylinder 4. In the present embodiment of my invention, I have shown the saw cylinder 7 to be slightly smaller in diameter than the saw cylinder 4, and, in practice, its surface speed of rotation would be about one-half that of the saw cylinder 4. The saw cylinder 7, therefore, will engage all such cotton passing through the space 6, or thrown backward by the saw cylinder 4, and carry it toward the point of closest approach of the surfaces of the two saw cylinders, whence it is delivered to the teeth of the upper saw cylinder or engaged by the teeth of said saw cylinder and removed from the teeth of the lower saw cylinder. Such cotton will be carried around by the saw cylinder 4 and ultimately be removed therefrom by the doffer 10. The hulls and trash knocked back by the saw cylinder 4 fall into the discharge trough and are continuously removed from the machine by the conveyor 13.

As it is a primary object of the invention to provide the maximum freedom for the discharge of hulls as rapidly as they are separated from the cotton, while, at the same time, avoiding any waste of any cotton of value, the provision and proportioning in size of the spaces between the lower edge of the hull-board and the upper saw cylinder and lower saw cylinder, respectively, are of the utmost importance. This latter space, that is, between the lower edge of the hull-board and the lower saw cylinder, is indicated by the numeral 16 and is of considerably greater width than the space 6. That is to say, the space 6, which, in practice, would be from three-fourths of an inch to an inch in width, is of a size to permit the free discharge of the hulls sliding down the hull-board while, at the same time, bringing the mixed cotton and hulls into such close proximity to the teeth of the saw cylinder 4 as to enable the cotton to be engaged thereby. The width of the space 16, however, must be such as to provide room for the hulls to be thrown back clear of the upper surface of the saw cylinder 7, and also to permit the cotton locks which may not at first be engaged by the teeth of the saw cylinder, to be also thrown back through this space. As there is no co-action between the lower edge of the hull-board and the surface of the saw cylinder 7, it is only necessary that the space 16 should be large enough for the operation stated. It may be, in practice, from two to three inches in width.

According to the respective diameters and relative speeds of rotation of the saw cylinders 4 and 7, the space indicated by 17, where the surfaces of the two saw cylinders come into closest proximity, may vary; that is to say, if the saw cylinder 7 has a surface speed of rotation greater than that indicated, this space may be larger than would be the case where the speed of rotation of the lower saw cylinder is approximately half that of the upper saw cylinder. With such increased speed of rotation of the lower saw cylinder, a great deal of the cotton, especially such as may be only loosely engaged by the teeth of the lower saw cylinder, will be thrown by centrifugal action against the teeth of the upper saw cylinder before such cotton reaches the narrow space 17, where it would be positively engaged by such teeth. In other words, while small pieces of hulls and trash that are not positively engaged by the teeth of the saw cylinder 4 are carried thereby into the space 17 between the two cylinders, no cotton is carried entirely through this space, as the cotton slips off of the teeth of the lower saw cylinder onto the teeth of the upper saw cylinder before it reaches the narrow part of the space 17. There is, therefore, no machining of the cotton delivered from the teeth of the lower cylinder to the teeth of the upper cylinder. In practice, the space 17 would vary from one-fourth to one-half an inch in width.

One of the chief advantages in the use of the two saw cylinders in relation to each other as shown, is that the space 6 between the lower edge of the hull-board and the upper saw cylinder and the space 16 between the lower edge of the hull-board and the lower saw cylinder, can be made large enough to permit a free and unobstructed discharge of hulls without entailing the loss of any cotton of value and without necessitating adjustment of the hull-board 3 to widen or narrow either space in changing from cotton of one character to that of another. This is a very great advantage in the commercial use of the machine, for the reason that with the smooth rollers that I have heretofore employed, it has been necessary to continually change the space between the hull-board and saw cylinder to meet the variations in condition and quality of the cotton and hulls being handled, and as the operators cannot be depended upon to make proper adjustment, there has resulted either a loss of good cotton or an imperfect separation between the cotton and hulls by reason of a failure to provide a free discharge for the hulls.

With the present invention, even when the machine is handling high grade cotton free from hulls, the spaces referred to do not require to be changed, since any cotton falling through the space 6 is not kicked by the saw cylinder 4 through the space 16 far enough to clear the cylinder 7, which accordingly engages said cotton and ultimately delivers it to the cylinder 4. The cylinder 7, therefore, recovers any cotton falling through the space 6 and returns it to the cylinder 7. On the other hand, if the character of the cotton being handled suddenly changes to a load containing a very large percentage of hulls, the spaces 6 and 16 are wide enough to permit a free discharge of these hulls, through the former by gravity and through the latter by the action of the saw cylinder 4, and thus avoid congestion of the hulls in the working chamber 15.

I claim:

1. A cotton cleaning machine comprising a pair of saw cylinders mounted one above the other to rotate in the same direction, having their teeth cut in the same direction, and providing between them a relatively narrow working space, and a hull-board for directing a supply of mixed cotton and hulls to the upper saw cylinder, the lower edge of which defines a space between it and the surface of said cylinder of a size to permit the free discharge of hulls therethrough and a second, but larger, space between it and the surface of the lower saw cylinder, to permit hulls to be knocked through the same by the upper saw cylinder over and beyond the surface of the lower saw cylinder while permitting the free return by the latter of cotton knocked through said space by the upper saw cylinder.

2. A cotton cleaning machine comprising a pair of saw cylinders mounted one above the other to rotate in the same direction, having their teeth cut in the same direction, and providing between them a working space at which the said teeth will be directed toward each other at the point of closest approach between the two cylinders, said space being of a width to cause cotton carried into the same by the lower saw cylinder to be engaged and removed therefrom by the teeth of the upper saw cylinder, and a hull-board positioned and inclined to direct a supply of mixed cotton and hulls to the upper saw cylinder, the lower edge of which hull-board defines a space between it and the surface of said cylinder of a size to permit the free discharge of hulls therethrough and a second, but larger, space between it and the surface of the lower saw cylinder, to permit hulls to be knocked through the latter space by the upper saw cylinder over and beyond the surface of the lower saw cylinder while permitting the free return by the latter of cotton knocked through said second space by the upper saw cylinder.

3. A cotton cleaning machine comprising a pair of saw cylinders mounted one above the other to rotate in juxtaposition to each other in the same direction and having their teeth pointed toward each other at the point of closest approach between the two cylinders, said saw cylinders being in such proximity that cotton carried around by the lower saw cylinder will be removed therefrom by engagement therewith of the teeth of the upper saw cylinder, said upper saw cylinder operating in a working chamber adapted to be supplied with mixed cotton and hulls and providing a discharge outlet for hulls past said saw cylinder located over the lower saw cylinder.

4. A cotton cleaning machine comprising a pair of saw cylinders mounted one above the other to rotate in juxtaposition to each other in the same direction and having their teeth pointed toward each other at the point of closest approach between the two cylinders, said saw cylinders being in such proximity that cotton carried around by the lower saw cylinder will be removed therefrom by engagement therewith of the teeth of the upper saw cylinder, said upper saw cylinder operating in a working chamber adapted to be supplied with mixed cotton and hulls and providing a discharge outlet for hulls past said saw cylinder located over the lower saw cylinder, a kicker roll co-operating with the upper saw cylinder in said working chamber, and a doffer co-operating with said upper saw cylinder outside of said working chamber.

In testimony whereof, I have hereunto set my hand.

JOHN E. MITCHELL.